US011882790B2

(12) United States Patent
Fillep et al.

(10) Patent No.: US 11,882,790 B2
(45) Date of Patent: Jan. 30, 2024

(54) AGRICULTURAL APPARATUS AND METHODS OF OPERATING AN AGRICULTURAL APPARATUS

(71) Applicant: AGCO International GmbH, Neuhausen (CH)

(72) Inventors: Johannes Fillep, Feucht (DE); Ronnie Kinast, Ilschwang (DE)

(73) Assignee: AGCO International GmbH, Neuhausen (CH)

( * ) Notice: Subject to any disclaimer, the term of this patent is extended or adjusted under 35 U.S.C. 154(b) by 315 days.

(21) Appl. No.: 17/199,359

(22) Filed: Mar. 11, 2021

(65) Prior Publication Data

US 2021/0282319 A1 Sep. 16, 2021

(30) Foreign Application Priority Data

Mar. 11, 2020 (GB) ...................................... 2003487

(51) Int. Cl.
*A01D 41/14* (2006.01)
*A01B 63/111* (2006.01)
(Continued)

(52) U.S. Cl.
CPC ........ *A01D 41/141* (2013.01); *A01B 63/1117* (2013.01); *A01D 34/008* (2013.01); *A01D 75/303* (2013.01)

(58) Field of Classification Search
CPC .. A01D 41/141; A01D 34/008; A01D 75/303; A01D 34/668; A01D 34/667; A01D 57/20; A01B 63/1117
See application file for complete search history.

(56) References Cited

U.S. PATENT DOCUMENTS 3,177,638 A * 4/1965 Johnson ............... A01B 73/067
56/7
3,717,981 A * 2/1973 van der Lely ......... A01D 34/66
56/15.8
(Continued)

FOREIGN PATENT DOCUMENTS

EP 2520155 A1 * 11/2012 ............. A01D 57/20
JP H07264913 A 10/1995
JP 2014143984 A 8/2014

OTHER PUBLICATIONS

EP 2520155 A1—English Translation Nov. 7, 2012.*
UK Intellectual Property Office, Search Report for related UK Application No. GB2003487.2, dated Sep. 3, 2020.

*Primary Examiner* — Thomas B Will
*Assistant Examiner* — Julia C Tran

(57) ABSTRACT

An agricultural apparatus including an agricultural vehicle together with a front work unit and two lateral work units located behind and to the sides of the front work unit. The front work unit has a connection to the front of the agricultural vehicle and the lateral work units share a connection to the rear of the agricultural vehicle. Each of the work units deposits cut crop as a swath. One or more sensors determine a height of the rear connection above the ground surface. A control unit is provided for controlling the height of the connections above the ground surface, such that if the height of the rear connection is determined to deviate from a predetermined value, the control unit causes the height of the rear connection to be adjusted towards the predetermined value.

5 Claims, 8 Drawing Sheets

(51) Int. Cl.
    *A01D 34/00*     (2006.01)
    *A01D 75/30*     (2006.01)

(56) References Cited

U.S. PATENT DOCUMENTS

| | | | |
|---|---|---|---|
| 3,731,469 A * | 5/1973 | Akgulian | A01D 75/30 56/12.6 |
| 4,876,845 A | 10/1989 | Sturgill | |
| 5,069,022 A * | 12/1991 | Vandermark | A01D 75/30 56/16.2 |
| 5,455,769 A * | 10/1995 | Panoushek | A01D 41/145 701/50 |
| 2001/0003239 A1* | 6/2001 | Franet | A01D 34/667 56/153 |
| 2004/0149461 A1* | 8/2004 | Ocsenknecht | A01D 41/141 172/272 |
| 2011/0153168 A1* | 6/2011 | Peterson | A01B 79/005 701/50 |
| 2012/0060459 A1* | 3/2012 | Hironimus | A01D 75/30 56/6 |
| 2017/0311541 A1* | 11/2017 | Pankaj | A01D 34/006 |
| 2018/0325031 A1* | 11/2018 | Rotole | A01D 43/102 |
| 2019/0116717 A1* | 4/2019 | Pauli | A01D 78/1085 |

* cited by examiner

AGRICULTURAL APPARATUS AND METHODS OF OPERATING AN AGRICULTURAL APPARATUS

CROSS REFERENCE TO RELATED APPLICATION

This application claims the benefit of the filing date of U.K. Application No. GB2003487.2, "Agricultural Apparatus," filed Mar. 11, 2020, which is hereby incorporated by reference in its entirety.

TECHNICAL FIELD

The present disclosure relates to an agricultural apparatus comprising an agricultural vehicle and a number of work units suitable for generating swathes of cut crop, and in particular to a mowing apparatus for cutting a standing crop such as hay.

BACKGROUND

It is known to provide a mower combination in which a first mower unit is located ahead of an agricultural vehicle such as a tractor with two further mower units trailing the agricultural vehicle. The rear mower units may be provided with conveyors for depositing cut crop into a swath or swathes behind the agricultural vehicle. When turning the mower units are raised from a working position to a raised headland position. The intent is that the mower units are raised above the swath or swathes such that the mower units do not disturb the cut crop as the mower units are moved over the swath or swathes. However, in certain cases, due to the high mass yields of the cut crop, the swath or swathes of cut crop produced may be so high that overrunning of the swath or swathes with the mower units in the headland position is no longer possible without causing damage to the swath or swathes of cut crop.

It would be beneficial to avoid damage to the swath or swathes of cut crop with the mower units in the headland position.

BRIEF SUMMARY

According to a first embodiment, an agricultural apparatus comprises an agricultural vehicle together with a front work unit and two lateral work units located behind and to the sides of the front work unit, the front work unit having a connection to a front of the agricultural vehicle and the lateral work units sharing a connection to a rear of the agricultural vehicle, each of the work units depositing a cut crop as a swath, one or more sensors for determining a height of the rear connection above a ground surface, a control unit for controlling a height of the connections above a ground surface. If the height of the rear connection is determined to deviate from a predetermined value, the control unit causes the height of the rear connection to be adjusted towards the predetermined value.

The agricultural apparatus may include a further sensor to detect the presence of crop ahead of the front work unit and in the event of no crop being detected as present, the control unit causes one or more of the work units to move from the working position to the headland position.

According to another embodiment, a method of operation of a mower combination comprises the providing a predetermined set of values to the control unit providing signals representative of the position of the rear connection, the control unit comparing the signals representing the position of the rear connection against a predetermined set of values and as required signaling the rear connection to be displaced based on this comparison.

The method may also include monitoring for the presence of standing crop ahead of the agricultural vehicle, and in the event of no crop being detected as present, the control unit causing one or more of the work units to move from the working position to the headland position.

According to another embodiment, a computer implemented method comprises a control unit receiving a plurality of signals, the signals representing the position of the rear connection, the control unit being configured to receive the plurality of signals and compare the signals for the position of the rear connection against a predetermined set of values and as required generating a signal to cause the position of the rear connection to be adjusted based on the comparison.

The method may also include monitoring for the presence of standing crop ahead of the agricultural vehicle, and in the event of no crop being detected as present, the control unit causing one or more of the work units to move from the working position to the headland position.

According to another embodiment, a computer readable storage medium comprises instructions that causes one or more processors to implement the methods described herein.

BRIEF DESCRIPTION OF THE DRAWINGS

Embodiments will now be described, by way of example only, with reference to the accompanying drawings, in which.

DETAILED DESCRIPTION

The disclosure will now be described in the following detailed description with reference to the drawings, wherein certain embodiments are described in detail. Although described with reference to these specific embodiments, it will be understood that the disclosure is not limited to these embodiments. But to the contrary, numerous alternatives, modifications, and equivalents will become apparent from consideration of the following detailed description.

Reference to terms such as longitudinal, transverse, and vertical are made with respect to a longitudinal vehicle axis, which is parallel to a normal forward direction of travel.

Figure 1:
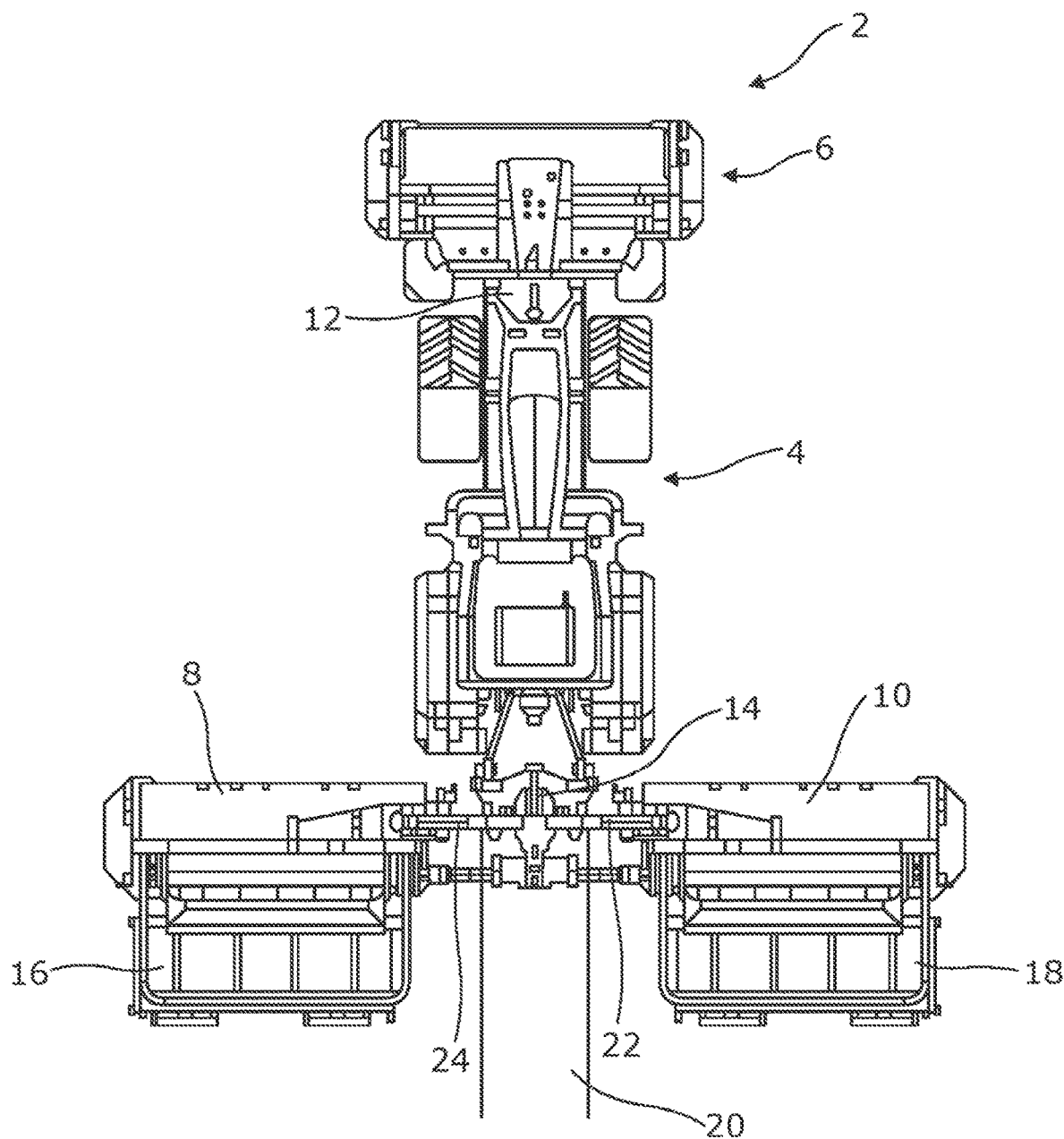
FIG. 1 shows a plan view of an agricultural apparatus.

With reference to FIG. 1, a plan view of an agricultural apparatus 2 is shown. The agricultural apparatus 2 comprises an agricultural vehicle 4 such as a tractor and a number of work units 6, 8, 10 suitable for cutting standing crop, the work units 6, 8, 10 being connected to the agricultural vehicle 4. The work units 6, 8, 10 include a front work unit 6 located to the front of the agricultural vehicle 4 and two lateral work units 8, 10 located behind and to the sides of the front work unit 6, each of the work units 6, 8, 10 depositing cut crop as a swath. The front work unit 6 is conveniently mounted on a front hitch 12 of the agricultural vehicle 4. In some embodiments, the work units 6, 8, 10 comprise mowing units.

The lateral work units 8, 10 are supported from a central chassis by lifting units, for example hydraulic units 22, 24. Each hydraulic unit 22, 24 may be used to move a respective lateral mowing unit 8, 10 between a working position and a transport position. A headland position may be defined between the working position and the transport position. In the working position, the height of each of the lateral mowing units 8, 10 above the ground surface 21 may be further controlled by operation of the hydraulic units 22, 24 between minimum and maximum displacement values—that is, across a ground adaptation range.

In FIG. 1, a swath 20 produced by the front work unit 6 is shown. In FIG. 1, conveyors 16, 18 mounted to the rear of the lateral work units 8, 10 direct cut crop inwardly to produce a broader central swath 20. These swathes are omitted from FIG. 1 for clarity.

Figure 2:
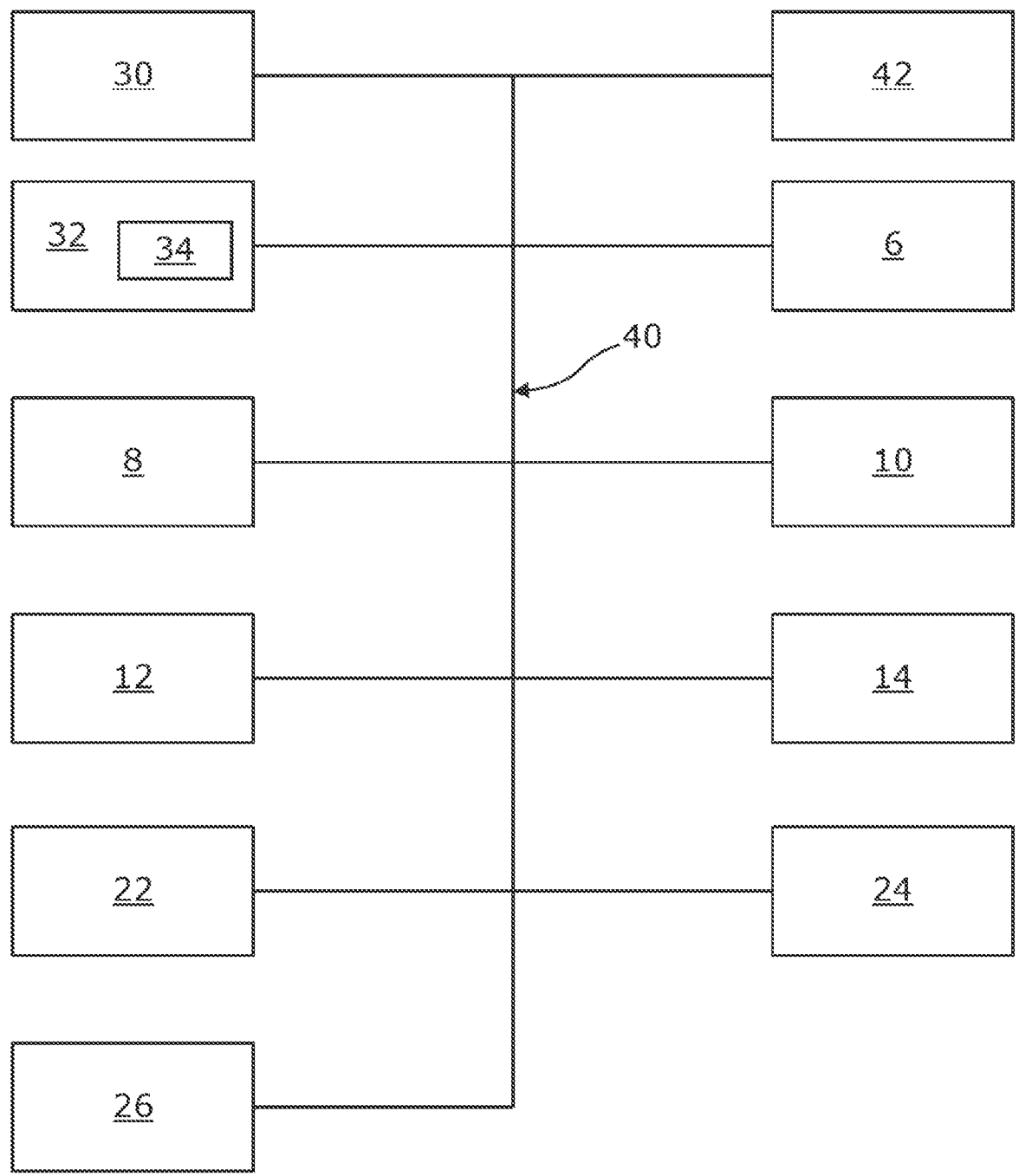
FIG. 2 shows a schematic view of elements of an agricultural apparatus.

A sensor 26 (FIG. 2) is provided to determine a displacement or position 50 of the rear hitch 14—that is, the relative position of the rear hitch 14 in relation to a reference position on the agricultural vehicle 4 (FIGS. 3A through 5A).

An operator can control operation of the front and rear work units 6, 8, 10 from within the agricultural vehicle 4 by use of a suitable user terminal 30. For example, the operator can cause each of the work units to move about the central frame from a working position to a headland position, and can cause each of the lateral work units 8, 10 to move between the working position and the transport position. As noted above, the operator can also control the working height of the lateral mowing units 8, 10 within the ground adaptation range by use of the hydraulic units 22, 24.

The user terminal 30 communicates with an electronic control unit 32. The control unit 32 provides signals to control operation of the front and rear hitches 12, 14 of the agricultural vehicle 4 and provides signals to control operation of the mowing units 6, 8, 10 and the conveyors 16, 18. Conveniently, the signals are provided by way of a suitable data communication network 40 such as one compliant with the ISOBUS standard (a network in conformance to ISO 11783).

The control unit 32 may comprise a single processor located on the agricultural vehicle, or its functions may be split between a processor located on the agricultural vehicle and one or more additional processors located on the mowing units 6, 8, 10, the additional processor(s) being in electronic communication with the first processor.

The control unit 32 is also able to access a suitable memory 34. The memory 34 may take any suitable form and is in electronic communication with the control unit 32.

It is desirable to maintain an even cut of the standing crop. When covering undulating or bumpy terrain, an operator has to maintain constant vigilance to maintain a desired working height of the lateral work units 8, 10 within the ground adaptation range of the lateral work units 8, 10. If the working height is too low, the lateral work units 8, 10 will come into contact with the ground surface. In such a case, the cut crop may become contaminated with dirt and/or the lateral work units 8, 10 may become damaged. If the working height is too high, there will be uncut areas of crop and so a loss of production in that area. Either outcome is undesirable.

Figure 3A:
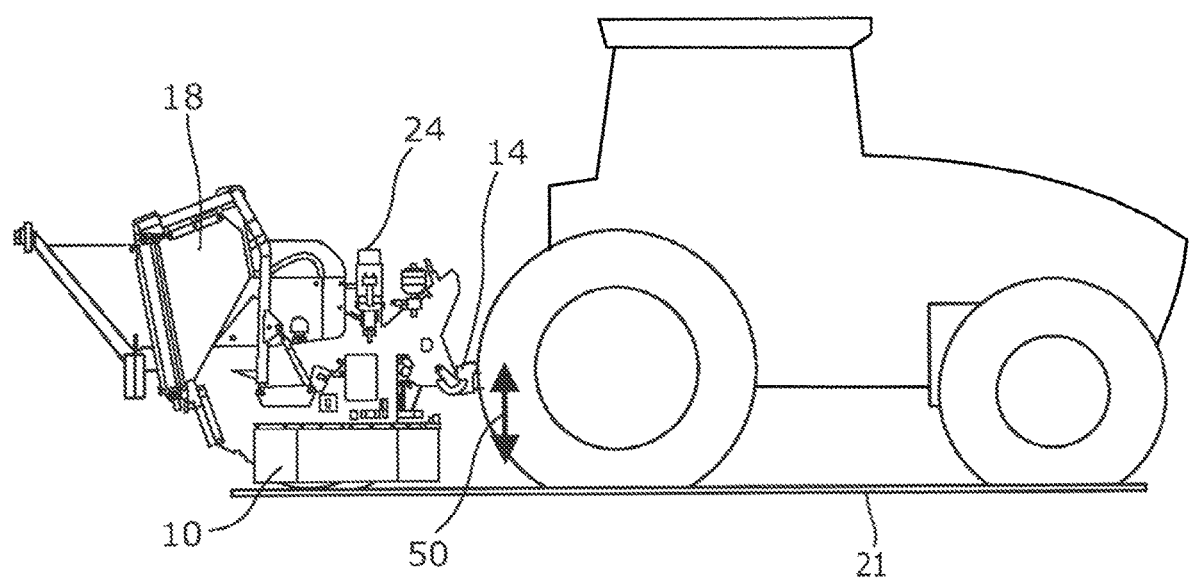
FIG. 3A shows a schematic side view of a portion of an agricultural apparatus provided with lateral work units in operation across level ground.
Figure 3B:
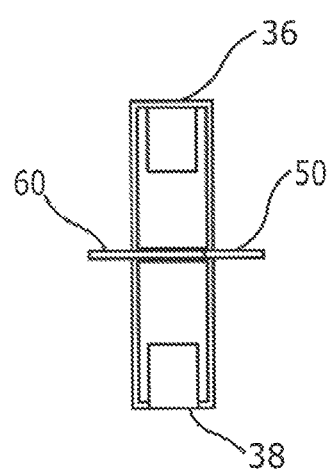
FIG. 3B shows a representation of the relative position of the displacement of the rear hitch in FIG. 3A with respect to the ground adaptation range of the lateral work units.

FIG. 3A shows operation of the agricultural apparatus 2 over level ground. FIG. 3B shows the maximum upper and lower heights 36, 38 of the lateral work units 8, 10—that is, the ground adaptation range of the lateral work units 8, 10 in relation to the agricultural vehicle 4 when the hitch 14 is in the position 50 shown in FIG. 3A. A predetermined reference value 60 for the desired displacement of the rear hitch 14 is shown to one side of FIG. 3B. The predetermined reference value 60 is conveniently stored in the memory in any suitable manner such as a database or look-up table. In the normal working position over level ground, the predetermined reference value 60 corresponds with the actual position 50 of the rear hitch 14.

Figure 4A:
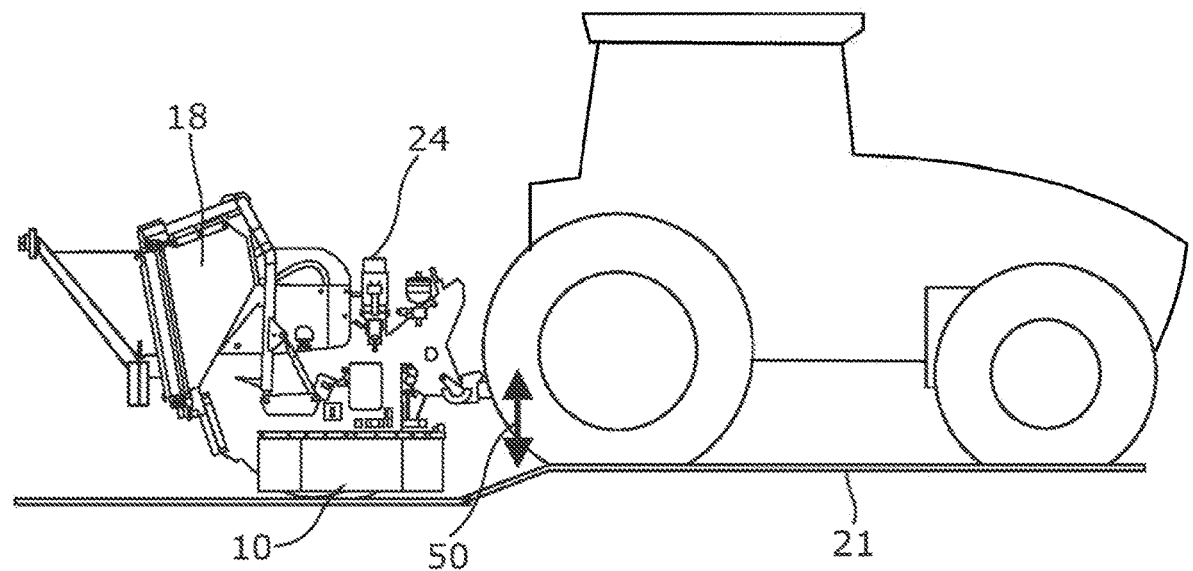
FIG. 4A shows a schematic side view similar to FIG. 3A, in which the agricultural vehicle is raised with respect to the lateral work units.
Figure 4B:
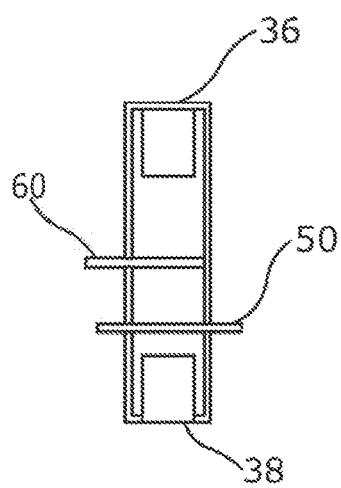
FIG. 4B shows a representation of the relative position of the displacement of the rear hitch in FIG. 4A with respect to the ground adaptation range of the lateral work units.
Figure 6:
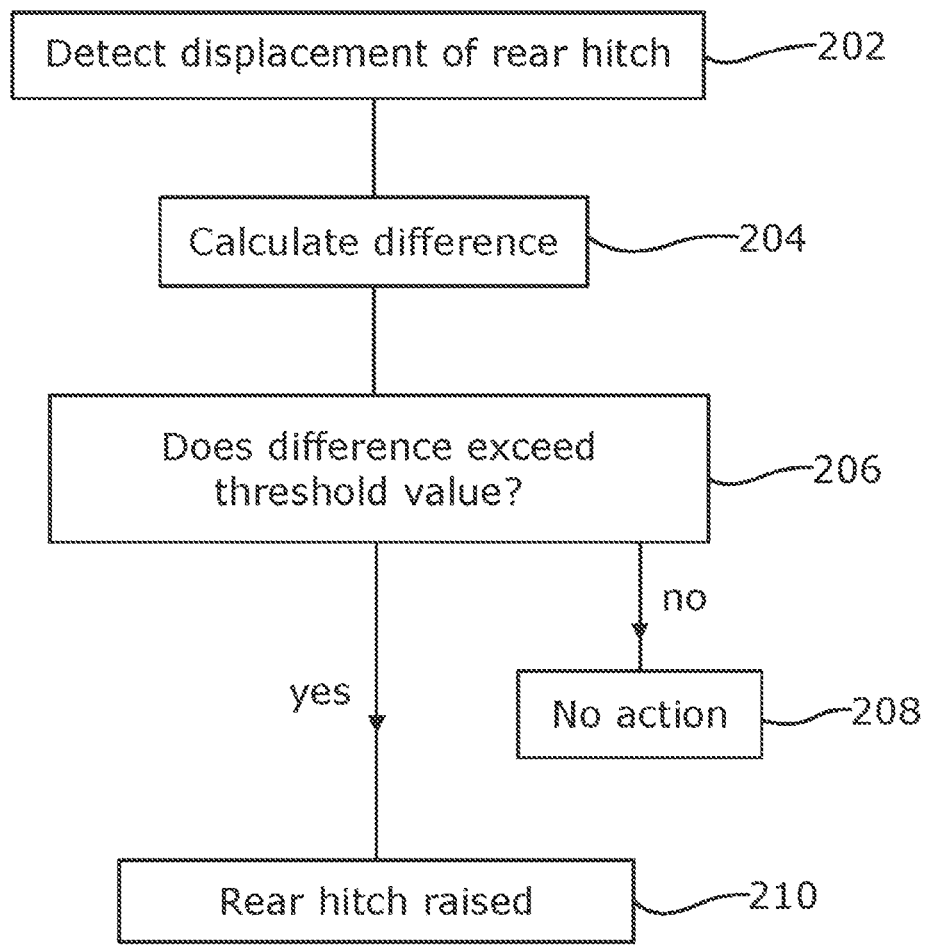
FIG. 6 shows a flow diagram in relation to a first operation of an agricultural apparatus.

FIG. 4A shows the agricultural vehicle 4 in a raised position with respect to the lateral work units 8, 10. The position or displacement of the rear hitch 14 is determined by the sensor 26 (see act 202, FIG. 6). FIG. 4B shows the position 50 of the rear hitch 14 is below the predetermined reference value 60 but is within an acceptable region of the ground adaptation range of the lateral work units, 8, 10. The difference between the position 50 of the hitch 14 and the predetermined reference value 60 is calculated (act 204). It is then determined whether this difference exceeds a predetermined threshold value (act 206).

The control unit 32 may be programmed to take a number of actions as desired. For example if the difference between the position 50 of the rear hitch 14 and the predetermined reference value 60 is determined not to exceed the threshold value, the control unit 32 takes no action to move the rear hitch 14 (act 208). The threshold value is conveniently also stored in the memory 34. For example, if the difference between the position 50 of the hitch 14 and the predetermined reference value 60 is determined to exceed the predetermined threshold value, the control unit 32 can take action to adjust the displacement of the rear hitch 14 (act 210). Alternatively, the control unit 32 can signal, either visually, audibly, or both, to the operator of the agricultural vehicle 4 by way of the user terminal 30 that the first threshold value has been exceeded so that the operator can take action on their own judgement.

Figure 5A:
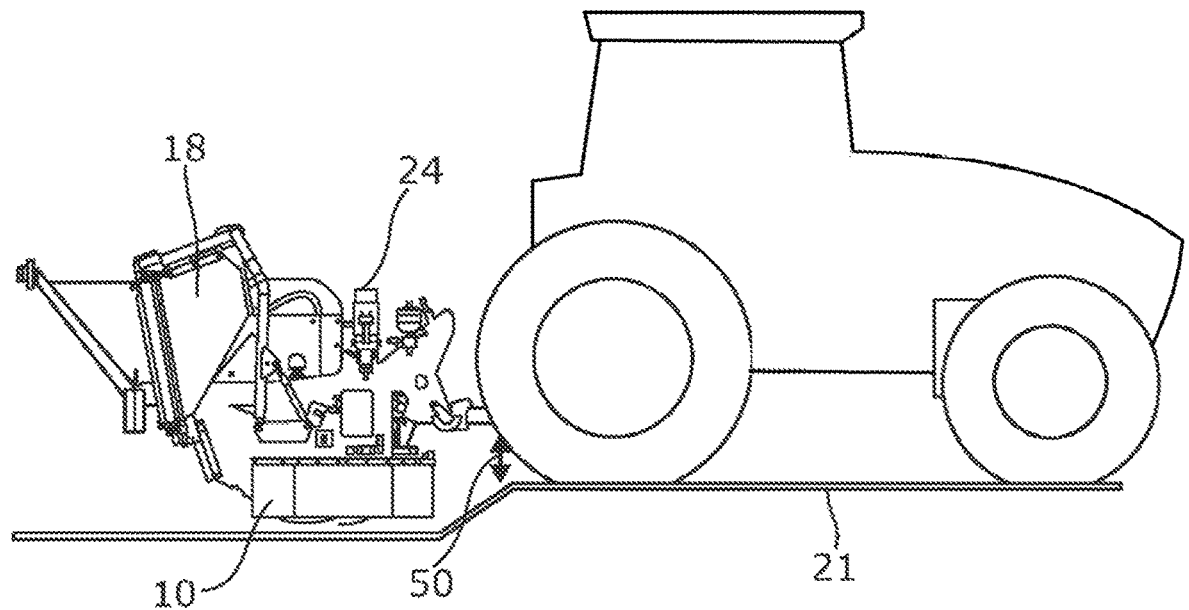
FIG. 5A shows a schematic side view similar to FIG. 4A in which the agricultural vehicle is raised further with respect to the lateral work units.
Figures 5B, 5C:
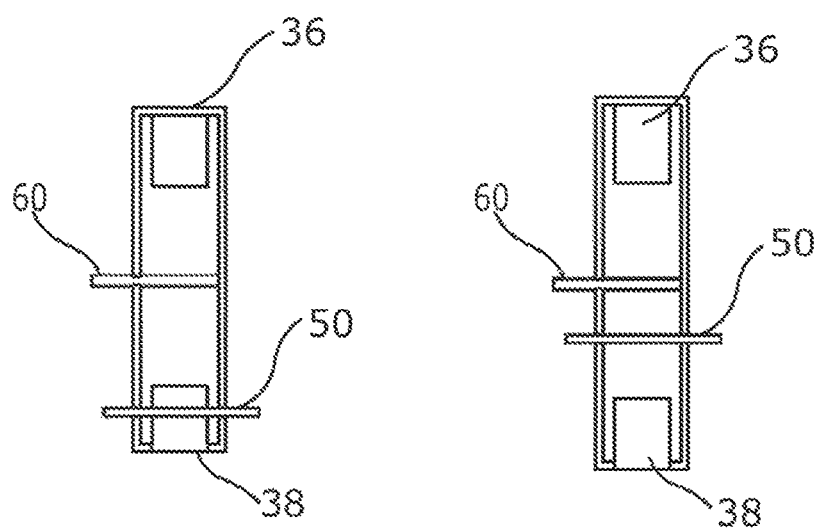
FIG. 5B shows a representation of the relative position of the displacement of the rear hitch in FIG. 5A with respect to the ground adaptation range of the lateral work units.
FIG. 5C shows a representation of the relative position of the displacement of the rear hitch in FIG. 5A with respect to the ground adaptation range of the lateral work units following operation of the control unit.
Figure 7:
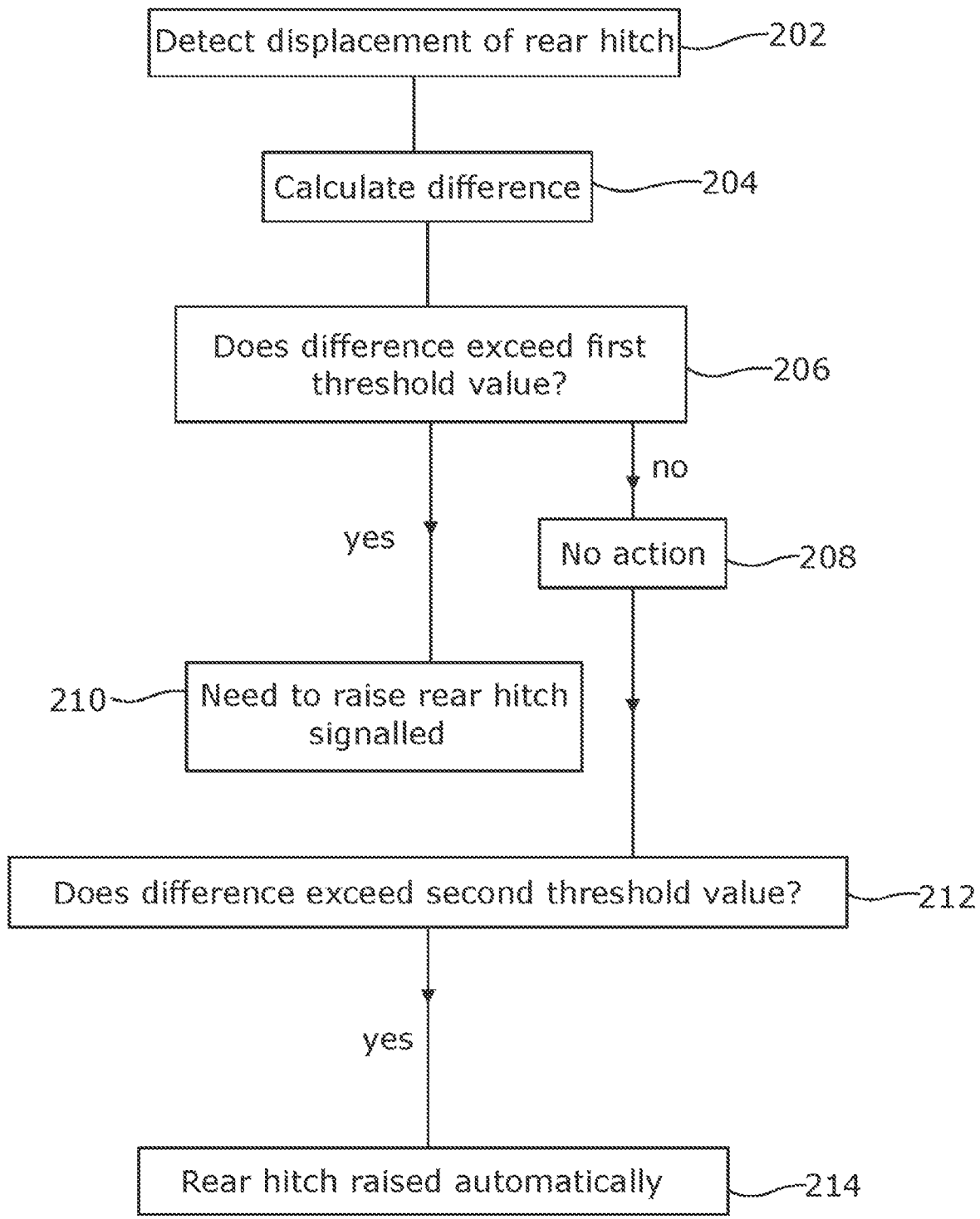
FIG. 7 shows a flow diagram in relation to a second operation of an agricultural apparatus.

FIG. 5A shows the agricultural vehicle 4 raised further in relation to the lateral work units 8, 10. As seen in FIG. 5B the lateral work units 8, 10 are now operating at or towards an edge of the ground adaptation range. This value or range of values can be defined as a second threshold value or values within the memory 34. FIG. 7 shows actions as the agricultural vehicle travels over an increasing gradient of slope (in FIG. 7 acts 202 to 210 are similar to those shown in FIG. 6). If no action is taken by the operator or the control unit when a first threshold value is encountered (act 208), the position of the rear hitch 14 continues to be compared to the first and second threshold values. In the event of the second threshold value being encountered, the control unit 32 automatically causes the rear hitch 14 to be displaced without input from the operator (acts 212, 214). In the new hitch position, the lateral work units 8, 10 are once again in operation comfortably within the ground adaptation range and can more easily be adapted to a desirable working position by the hydraulic units 22, 24. The rear hitch 14 may be raised to the new hitch position such that the mower combination is adjusted to the new terrain by the time the lateral work units 8, 10 arrive at the new terrain. In this way, damage to the lateral work units 8, 10 and/or contamination of the cut crop may be avoided.

In an alternative embodiment, on detecting the first threshold value, the control unit 32 may be programmed to alter the height of the rear hitch 14 toward the reference value 50 and if the second threshold value is then encountered, the control unit 32 causes the rear hitch 14 to be moved more swiftly toward the reference value.

If the opposite slope is encountered, similar acts are undertaken to ensure consistent cutting of the standing crop, that is for the first threshold value the operator may be alerted or the height of the rear hitch 14 altered and for the second threshold value the control unit 32 automatically alters the height of the rear hitch 14.

This combination of actions is also useful when encountering bumpy terrain so that the work units 8, 10 may be controlled to avoid damage and/or ensure a consistent cut of the standing crop when traversing such terrain.

Figure 8:
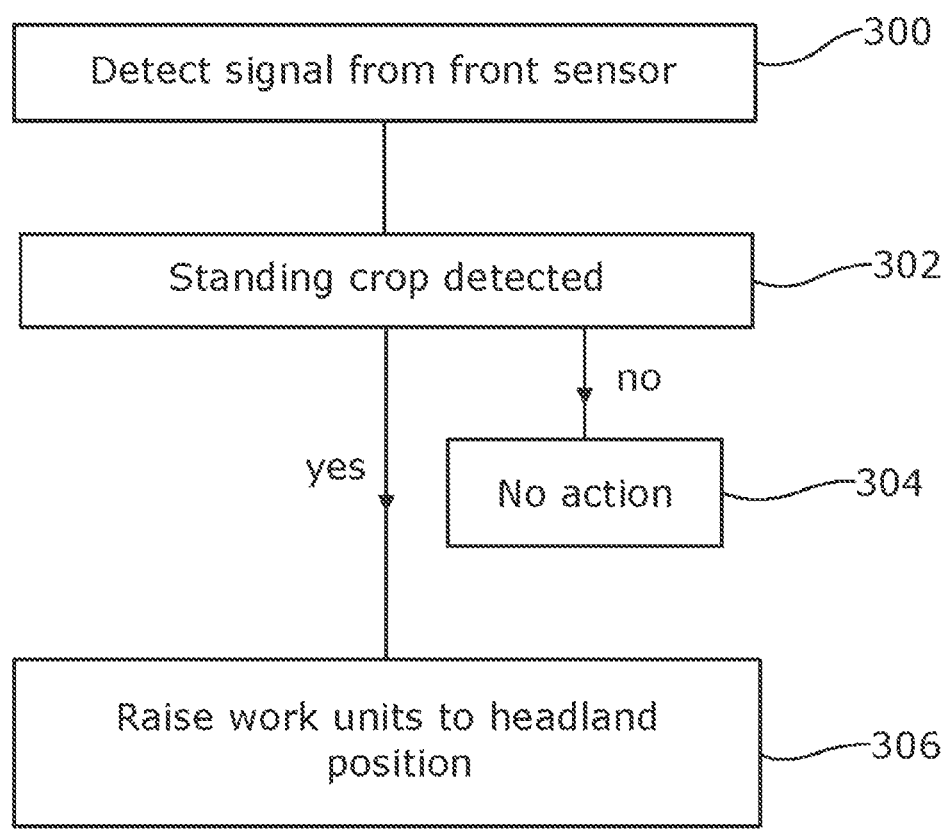
FIG. 8 shows a flow diagram in relation to a third operation of an agricultural apparatus.

In a further embodiment, a front sensor 42 detects the presence or absence of standing crop ahead of the agricultural apparatus 2. This front sensor 42 may be mounted on the agricultural vehicle 4 or on the front work unit 6. Alternatively, an aggregated signal from sensors 42 on both the agricultural vehicle 4 and the front work unit 6 may be used. The control unit 32 detects the signal from the front sensor 42 (act 300 in FIG. 8) and determines the presence or absence of standing crop ahead of the front work unit 6 (act 302).

If standing crop is detected, the control unit 32 takes no action and the work units 6, 8, 10 continue to operate in the working position (act 304). If no standing crop is detected, the control unit 32 causes the work units 6, 8, 10 to move to the headland positions (act 306). In this way, the when the edge of the standing crop to be processed is reached, the agricultural implement is operated to reach the headland position as soon as possible.

By monitoring the speed of the agricultural vehicle 4, the front work unit 6 may first be moved to a headland position and the lateral work units 8, 10 may be subsequently controlled to continue cutting the standing crop until the edge of the standing crop is reached and then the lateral work units 8, 10 also are automatically raised to their headland position.

Still other embodiments involve a computer-readable storage medium (e.g., a non-transitory computer-readable storage medium) having processor-executable instructions configured to implement one or more of the techniques presented herein. Many such computer-readable media may be devised by those of ordinary skill in the art that are configured to operate in accordance with one or more of the techniques presented herein.

From reading the present disclosure, other modifications will be apparent to persons skilled in the art. Such modifications may involve other features which are already known in the field of mowers and component parts therefore and which may be used instead of or in addition to features already described herein.

The invention claimed is:

1. An agricultural apparatus comprising:
an agricultural vehicle;
a front work unit coupled to a front of the agricultural vehicle via a front connection;
two lateral work units coupled to a rear of the agricultural vehicle via a shared rear connection and oriented behind and to the sides of the front work unit, wherein each of the front work unit and the two lateral work units is configured to deposit cut crop as a swath;
at least one sensor configured to detect a height of the shared rear connection above a ground surface; and
a control unit operably coupled to the at least one sensor, the control unit comprising:
at least one processor; and
at least one memory storing instructions thereon that, when executed by the at least one processor, cause the control unit to:
responsive to a determination that a difference between a detected height of the shared rear connection and a selected height is above a first threshold value, provide a notification that the difference exceeds the first threshold value,
responsive to an operator input responsive to the notification, adjust a height of the shared rear connection at a first rate;
responsive to an absence of an operator input responsive to the notification, continue to monitor the difference between the detected height of the shared rear connection and the selected height; and
responsive to a determination that the difference between the detected height of the shared rear connection and the selected height is above a second threshold value, automatically, without operator input, adjust a height of the shared rear connection at a second, different rate.

2. The agricultural apparatus of claim 1, further comprising:
at least one additional sensor configured to detect a presence of standing crop ahead of the front work unit, wherein the control unit is configured to:
responsive to not detecting standing crop ahead of the front work unit, cause at least one of the front work unit or the two lateral work units to move from a working position to a headland position; and
responsive to detecting standing crop ahead of the front work unit, maintain positions of the front work unit and the two lateral work units.

3. A method of operating an agricultural apparatus, the method comprising:
detecting a current height of a shared rear connection between an agricultural vehicle and two lateral work units;
comparing the detected height of the shared rear connection to a selected height;
responsive to a determination that a difference between the detected height of the shared rear connection and the selected height is above a first threshold value, providing a notification that the difference exceeds the first threshold value;
responsive to an operator input responsive to the notification, adjusting the height of the shared rear connection at a first rate;

responsive to an absence of an operator input responsive to the notification, continuing to compare the detected height of the shared rear connection to the selected height; and responsive to a determination that the difference between the detected height of the shared rear connection and the selected height is above a second threshold value, automatically, without operator input, adjusting the height of the shared rear connection at a second, different rate.

4. The method of claim 3, further comprising:

monitoring for standing crop ahead of the agricultural vehicle; and responsive to not detecting standing crop ahead of the agricultural vehicle, causing the two lateral work units to move from a working position to a headland position.

5. An agricultural apparatus comprising:

an agricultural vehicle;

a front work unit coupled to the agricultural vehicle via a first connection;

two lateral work units coupled to the agricultural vehicle via a shared second connection and oriented behind and to the sides of the front work unit, wherein each of the front work unit and the two lateral work units is configured to deposit cut crop as a swath;

at least one sensor configured to detect a height of the shared second connection above a ground surface;

at least one additional sensor configured to detect a presence of standing crop ahead of the front work unit, and a control unit operably coupled to the at least one sensor and the at least one additional sensor, the control unit comprising:

at least one processor; and at least one memory storing instructions thereon that, when executed by the at least one processor, cause the control unit to:

responsive to a determination that a difference between a detected height of the shared second connection and a selected height is above a first threshold value, provide a notification that the difference exceeds the first threshold value;

responsive to an operator input responsive to the notification, adjust a height of the shared second connection at a first rate;

responsive to an absence of an operator input responsive to the notification, continue to monitor the difference between the detected height of the shared rear connection and the selected height; and responsive to a determination that the difference between the detected height of the shared second connection and the selected height is above a second threshold value, automatically, without operator input, adjust the height of the second connection at a second, different rate;

responsive to not detecting standing crop ahead of the front work unit, cause at least one of the front work unit or the two lateral work units to move from a working position to a headland position; and responsive to detecting standing crop ahead of the front work unit, maintain positions of the front work unit and the two lateral work units.

* * * * *